Aug. 18, 1959 M. CAMRAS 2,900,444

MEANS FOR RECORDING AND REPRODUCING VIDEO SIGNALS

Filed Jan. 12, 1953 2 Sheets-Sheet 1

Inventor
Marvin Camras
by Hill, Sherman, Meroni, Gross & Simpson Attys

Aug. 18, 1959 M. CAMRAS 2,900,444

MEANS FOR RECORDING AND REPRODUCING VIDEO SIGNALS

Filed Jan. 12, 1953 2 Sheets-Sheet 2

Inventor
Marvin Camras
by Hill, Sherman, Meroni, Gross & Simpson
Attys 2,900,444
Patented Aug. 18, 1959

2,900,444

MEANS FOR RECORDING AND REPRODUCING VIDEO SIGNALS

Marvin Camras, Chicago, Ill., assignor to Armour Research Foundation of Illinois Institute of Technology, Chicago, Ill., a corporation of Illinois Application January 12, 1953, Serial No. 330,667

8 Claims. (Cl. 178—6.6)

This invention relates to the magnetic recording and reproduction of video signals and particularly to the magnetic recording and reproduction of video signals generated by moving visual impulses.

The recording and reproducing apparatus of the present invention is particularly adapted for the recording and reproduction of video signals, such as television signals, on a lengthy magnetizable medium. In television, at the present time, the moving scene to be transmitted is translated into electrical impulses by means of a process of scanning wherein an exploring element or spot is moved over the scene to be transmitted in periodic repeated paths covering the image area. The exploring element is so constructed that it generates a television signal which indicates brightness of its instantaneous position. This television signal is transmitted over the communication channel to the reproducing spot whose brightness is controlled by the signal. The reproducing spot moves over the viewing screen in a path similar to, and synchronous with, that of the exploring element. Thus, the reproducing spot reconstructs at the viewing screen, both in magnitude and position, the brightness distribution of the image area. The path covering the image area at the viewing screen is commonly a series of straight parallel lines, and commonly the scene is scanned at the rate of 60 interlaced pictures, or 30 complete frames per second to give the image the illusion of continuous motion.

One of the principal features and objects of the present invention is the provision of a novel method and means for recording and reproducing a video signal such as a television signal.

Another object of the present invention is to provide a novel method and means for translating a magnetic signal into an electrical signal.

Still another object of the present invention is to provide a novel method and means for translating an electrical signal into a magnetic signal.

A further object of the present invention is to provide a novel magnetic recorder apparatus.

A still further object of the present invention is to provide a novel magnetic reproducer apparatus.

Another and further object of the present invention is to provide a novel method and means for recording serially related electrical signals on a lengthy magnetizable medium.

Other objects and features which I believe to be characteristics of my invention are set forth with particularity in the appended claims. My invention itself, however, both as to its organization, manner of construction, and method of operation, together with further advantages and objects thereof, may be best understood by reference to the following description taken in conjunction with the accompanying drawings, in which:

As shown on the drawings.

Figure 1:
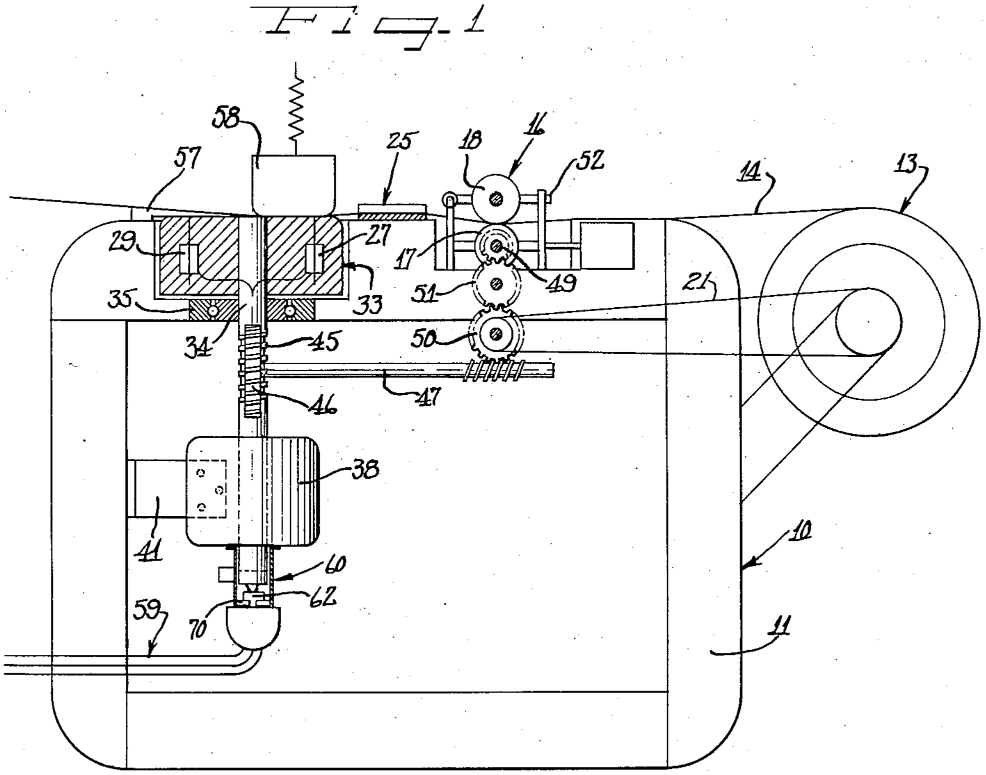
Figure 1 is a longitudinal sectional view of a magnetic recording apparatus according to the present invention.

In Figure 1 is illustrated a magnetic recording and reproducing apparatus 10 constructed in accordance with the principles and teachings of the present invention. The apparatus comprises a housing 11 having a supply reel (not shown) mounted at one end thereof and a take up reel 13 mounted at the other end for receiving an elongated magnetizable medium 14 from the supply reel. The elongated medium is preferably driven at constant speed by means of a capstan drive 16. The capstan drive may comprise any well known system and is illustrated as including a lower drive roller 17 and an upper pressure roller 18. The take up reel 13 may be driven from the drive train for roller 18 by means of a belt 21 at a speed to take up slack in the elongated medium during the entire recording or reproducing operation, the belt being adjusted to slip where slower speeds of the take up reel 13 are required. A guide plate 25 is provided for guiding the medium 14 into the capstan drive 16 and for maintaining the lateral position of the medium.

Figure 2:
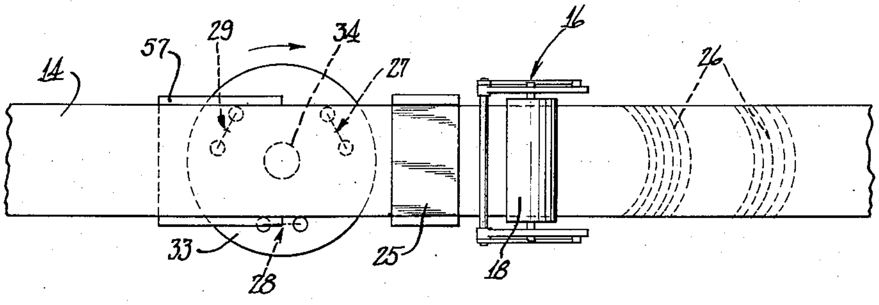
Figure 2 is a fragmentary top plan view of the apparatus.

The video signal is recorded on the medium 14 by recording successive lines of the video signal transversely across the medium so that each frame of the video signal has a corresponding magnetic frame on the tape as indicated by the dash lines at 26 in Figure 2. If only a single line of the video signal is recorded across the width of the medium, then a magnetic image would be present on the medium which would correspond to a television picture frame, or half frame where interlaced scanning is used. The magnetic pattern can actually be made visible if the medium is dusted with iron filings or the like. Examples of magnetized elongated media are illustrated in my co-pending application entitled "Magnetic Recorder and Reproducer for Video," filed April 11, 1952, and having Serial No. 281,939.

In the present embodiment, the magnetic pattern on the tape corresponding to the video signal is produced by moving a magnetic transducer head transversely across the medium while introducing the video signal to the head. A number of heads may be utilized and may be rotated about a central axis at a high speed. As illustrated in Figure 2, in the present embodiment, three transducer heads 27, 28 and 29 are mounted about a central spindle 34 for successively traversing the magnetizable medium 14. The heads may comprise laminations of high permeability material, having a thickness for example of 0.001 inch and provided with a gap of for example, 0.0003 inch or smaller. If the elongated medium comprises a tape having a four-inch width, the heads may be equally spaced on a radius of 2.30 inches about the axis. If the spindle 34 is rotated at a speed of about 31,500 revolutions per minute or more, and if ten lines of the video signal are recorded for each traverse of the tape by a head, the tape may travel at approximately fifteen inches per second and record 15,750 lines or 60 interlaced frames of the video signal per second. Under these circumstances, successive magnetic tracks across the tape will be closely adjacent with a head having a 0.001 inch thickness.

By running the tape at a higher speed than fifteen inches per second, the tracks will be spaced; and this feature is useful for automatic tracking to be hereinafter described. However, regardless of the speed of the tape, the motor is preferably run in synchronism with the video signal so that the revolutions per second is an integral multiple of the line frequency, and so that data are recorded in parallel columns across the tape width.

The heads 27, 28 and 29 are indicated as mounted in a disk 33 carried on the spindle 34. The spindle is mounted on bearing 35 for rotation by means of the motor 38. Bearing 35 can be substituted for the upper motor bearing, so that the assembly runs in only two bearings. The motor is suitably supported in the housing as by bracket means 41.

The motor 38 may be, for example, of the type operated from a relatively high frequency A.-C. source. Alternatively the motor may be a well shielded and isolated D.-C. type motor with a regulator for exact speed setting. In recording, the motor is preferably synchronized with the incoming video signal so that a definite number of lines are recorded per head traverse, such as ten lines as previously mentioned. In a video broadcast station, the motor would run in synchronism with the master sync generator of the station.

To synchronize the rotation of the heads with the movement of the tape, a positive non-slipping drive train preferably drives the capstan roll 17 from the shaft 34. Herein the drive includes a worm 45 on the shaft 34 having a gear 46 in mesh therewith. The gear 46 is on worm shaft 47 which drives the capstan drive gear 49 through intermediate gears 50 and 51. The gear 49 may be coupled with the capstan roll 17 by a suitable compliance, as a rubber tube, and the capstan roll 17 may be provided with a flywheel to dampen momentary speed fluctuations due to gear teeth, etc. The gear ratios may be so selected that the tape is driven at approximately fifteen inches per second, for example, where the shaft 34 is rotating at 31,500 r.p.m.

For reproducing a recorded signal, the same apparatus may be utilized. In this case, the motor 38 may be run at constant speed or in synchronization with other video apparatus used in conjunction with this reproducer. In a system such as a video broadcast station, the motor 38 would run in synchronism with the master sync generator of the station. Generally, at the present time, a television picture tube has a scanning control circuit which is governed by the synchronizing pulses of the original video signal. Since these synchronizing pulses are recorded on the tape, reproduction is accomplished simply by operating the motor at a speed to lend the illusion of motion to the scene being reproduced, the picture tube scanning rate being synchronized with the speed of the motor by means of the recorded synchronizing pulses.

Various means may be utilized for insuring that during reproduction the heads will track properly on the recorded signal in spite of possible stretching of the tape or the like. For example, the capstan rolls 17 and 18 may be mounted on a carriage 52 which can be moved fore and aft slightly for adjusting the longitudinal position of the tape 14 relative to the heads. This is preferably done by a servo mechanism indicated diagrammatically at 53, which may act to maximize the intensity of the frame synchronizing pulses, for example. It is desirable to utilize a tape which is free from stretch, and to provide sprocket holes in order to reduce tracking problems.

Figure 6:
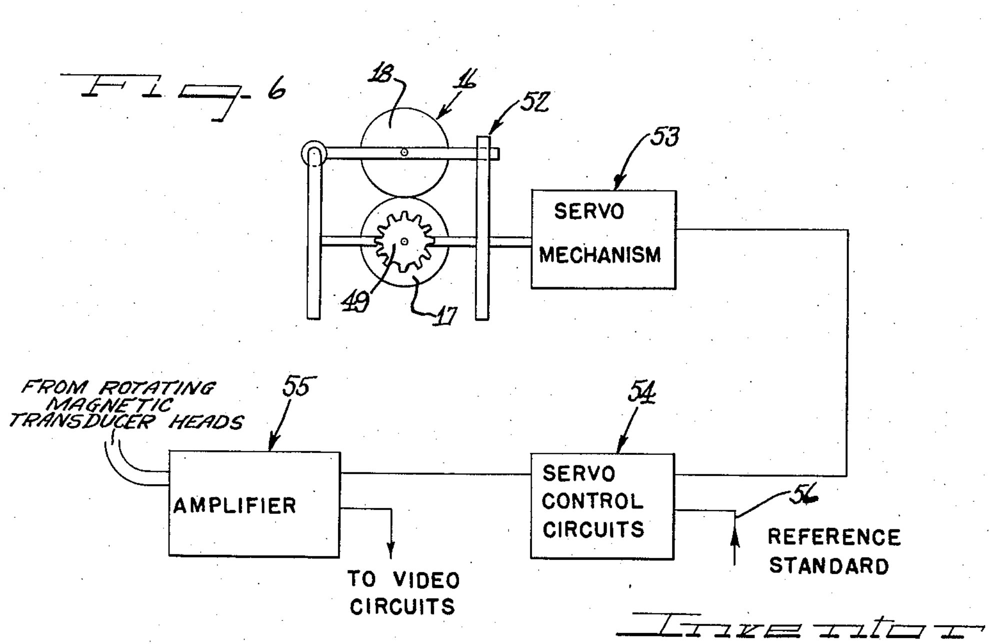
Figure 6 is a diagrammatic illustration of a system for providing automatic tracking adjustment at the capstan drive.

As indicated in Figure 6, the servomechanism 53 may be controlled by suitable servo control circuits indicated at 54 which for example, may receive the frame synchronizing pulse signal from the amplifier 55 and act to energize the servomechanism 53 to maximize the signal, or to adjust the position of the carriage 52, so as to bring the intensity of the synchronizing pulses above a predetermined minimum value which would correspond to an adequate picture signal strength at the output of the amplifier. The predetermined minimum reference value is preferably adjustable and is indicated as being introduced into the servo control circuit 54 at 56.

Lateral adjustment of guide 25 may likewise be effected to maintain proper alignment of the tape.

Figure 3:
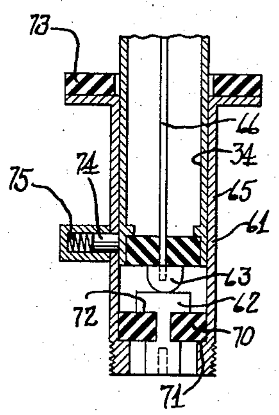
Figure 3 is an enlarged fragmentary longitudinal sectional view of a coaxial type connection for establishing electrical continuity with the rotating heads connected together as in series or in parallel.

In the embodiment illustrated in Figures 1, 2 and 3, the video signal to be recorded is applied to the heads 27, 28 and 29 in parallel, a separator member 57 being provided to separate the tape from the left half of the disk 33 so that only one head records on the tape at any given instant of time. A series connection of the heads may also be used successfully. A pressure pad 58 with a rounded leading edge may be utilized for urging the tape against the operative head at the right side of disk 33.

For reducing electrical interference, a coaxial type connection is utilized to supply the video signal to the heads and may include a coaxial cable 59 extending into the housing 10. The cable 59 may be threaded onto a coaxial fitting 60 which is secured to the housing of motor 38 and serves as a bearing support for the shaft 34. The outer conductor of the cable 59 connects with the outer sleeve 61 of the fitting 60, Figure 3. A button 63 is carried at the lower end of the armature shaft and is insulated therefrom by means of a non-conducting member 65. The button 63 rides on a bearing member 62 and is thus in electrical connection therewith. Each of the heads 27, 28 and 29 is connected between a conductor 66 extending centrally from button 63 within the spindle, and the spindle itself. The bearing member 62 is supported in the fitting sleeve 61 by means of an insulating member 70 interposed between internal shoulder 71 of sleeve 61 and shoulder 72 of member 62, Figure 3. A washer 73 of insulating material may be utilized to insulate the sleeve 61 from the motor casing 38.

As indicated in Figure 3, a supplemental brush 74 may be provided for securing good contact between sleeve 61 and shaft 34, the brush being urged against the periphery of the shaft by means of spring 75.

Figure 4:
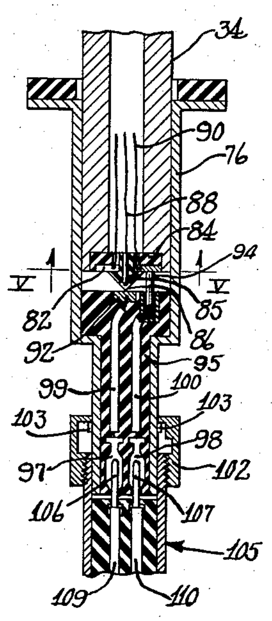
Figure 4 is a longitudinal sectional view similar to Figure 3, but illustrating a coaxial type connection wherein electrical continuity is established with the rotating heads successively by means of a commutator.
Figure 5:
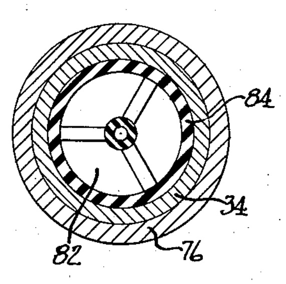
Figure 5 is a cross sectional veiw taken substantially along the line V—V of Figure 4.

In the embodiment of Figures 4 and 5, a fitting sleeve 76 is secured to the housing of motor 38 and receives the lower end of the motor shaft 34 therein. Where there are three heads to be successively energized, the shaft 34 carries three arcuately spaced commutator segments 82, Figure 5, which are insulated from the shaft by block 84. Projecting centrally from the block 84 is a nose portion 85 which has a conducting tip 86. A center conductor 88 connects with tip 86 while conductors 90 each connect with one of the commutator segments 82. Each of the heads 27, 28 and 29 is connected between the center conductor 88 and one of the conductors 90.

For establishing electrical continuity with conductors 88 and 90, the sleeve 76 is provided with a conducting block 92 centrally thereof for engaging conducting tip 86 of the block 84. The weight of the motor armature and shaft 34 may be supported by block 92 of sleeve 76 to insure good electrical contact therebetween. A brush 94 may also be carried by sleeve 76 for making contact with the commutator segments 82. Insulating material 95 may be provided in sleeve 76 for retaining and supporting block 92 and brush 94.

At its lower end, sleeve 76 is illustrated as having a pair of sockets 97, 98 which are connected by conductors 99, 100 with block 92 and brush 94. The sleeve 76 has an internally threaded connector piece 102 slidably carried thereon and retained therewith by a shoulder 103. The piece 102 is adapted to be screwed into threaded engagement with a two conductor cable 105 having prongs 106 and 107 for engagement in sockets 97 and 98. The two conductors 109 and 110 of cable 105 are thus connected respectively with block 92 and brush 94. As the shaft 34 rotates, conductor 110 is connected through brush 94 and commutator segments 82 successively with the heads 27, 28 and 29. The heads may be so arranged relative to the commutator segments, that each head is energized only as it travels across the tape 14 in one direction.

The cable 105 is preferably grounded at one end to serve as a shield for the conductors.

It will be understood that modifications and variations may be effected without departing from the scope of the novel concepts of the present invenion.

I claim as my invention:

1. In combination in a magnetic transducer apparatus for a video signal having synchronizing pulses, a plurality of magnetic transducer heads, means for mounting said heads in arcuately spaced relation about a central axis, means for rotating said heads about said axis, means for moving an elongated medium having a video signal recorded thereon across a portion of the path of travel of said heads for successive interaction with said head, means for shifting said record member moving means to shift said medium relative to said heads, means responsive to said synchronizing pulses reproduced by said heads for actuating said shifting means to increase the intensity of said reproduced pulses, and means connected with the output of said transducer heads and with said responsive means for delivering said synchronizing pulses reproduced by said heads to said responsive means.

2. In combination in a magnetic transducer apparatus for recording a video signal having a given line frequency on an elongated magnetizable medium: means defining a path of travel for the elongated magnetizable medium; a plurality of transducer heads; means mounting said transducer heads for successive periodic travel across the path of travel of the medium; means for moving said transducer heads successively and periodically across said path of travel and adjusted to provide a rate of repetition of successive traverses of each head across the path of travel of the medium eaqual to the inverse of an integral number of the order of 10, times the line frequency of the signal, divided by the number of heads employed; the length of the portion of the path of travel of each head during which the head crosses said path of travel of the medium and the speed of the head being such that the head is traversing the path of travel of the medium for at least a period of time equal to the period required for a predetermined integral number of lines of the video signal equal to said integral number to occur; means for applying said video signal to each head as it traverses the path of travel of the medium to deliver to said head at least said predetermined number of lines as said head traverses said path of travel of the medium; means for moving the medium along said path of travel thereof to displace the paths of successive heads across the medium; and means whereby corresponding portions of lines separated by said predetermined number of lines will be recorded in longitudinally adjacent relation on the medium to minimize the effects of tracking errors during reproduction.

3. In combination in a magnetic transducer apparatus for recording a video signal having a given line frequency on an elongated magnetizable medium, means defining a path of travel for the elongated magnetizable medium, a plurality of transducer heads, means mounting said transducer heads for successive periodic travel across the path of travel of the medium, means for delivering a plurality of lines of a video signal to each head as it travels across the medium, means moving each head across the medium at a speed to record an integral number of lines on said medium which integral number represents a small fraction of the number of lines per frame of the video signal, and means for traveling said medium along said path of travel at a substantially constant speed.

4. In combination in a magnetic transducer apparatus for recording a video signal comprising a series of frames each consisting of a relatively large number of lines, the video signal having a given line frequency, on an elongated magnetizable medium, means defining a path of travel for the elongated magnetizable medium, a plurality of transducer heads, means mounting said transducer heads for successive periodic travel across the path of the medium, means for moving the transducer heads and the medium to move the heads across longitudinally displaced transverse portions of the medium with successive heads recording lines of said signal in longitudinally aligned relation on the medium, and means whereby corresponding portions of lines of a single frame will be recorded in longitudinally adjacent relation on the medium to minimize the effects of tracking errors during reproduction.

5. In combination in a magnetic transducer apparatus for recording a video signal having a given line frequency on an elongated magnetizable medium, means defining a path of travel for the elongated medium, a magnetic transducer head, means mounting said transducer head for angular movement about an axis and along a path intersecting the path of travel of the medium, means for moving said transducer head along its path of travel at an angular frequency equal to an integral submultiple of the line frequency, and means whereby corresponding portions of recorded lines of a single frame on the medium will be recorded in longitudinally adjacent relation on the medium to minimize the effects of tracking errors during reproduction.

6. In combination in a magnetic transducer apparatus for recording a video signal having a given line frequency on an elongated magnetizable medium, means defining a path of travel for the elongated magnetizable medium, a magnetic transducer head, means mounting said transducer head for travel transversely of the path of travel of the medium for cooperation with successive transverse portions of the record medium, means for moving said head into cooperation with longitudinally displaced and aligned portions of the medium at a repetition rate related to the line frequency by an integer which is equal to a small fraction of the number of lines per frame of the video signal, and means whereby corresponding portions of lines recorded on the magnetic magnetizable medium are recorded in longitudinally adjacent relation on the medium to minimize the effects of tracking errors during reproduction.

7. In combination in a magnetic transducer apparatus for recording a video signal having a given line frequency on an elongated magnetizable medium, means defining a path of travel for the elongated magnetizable medium, means for moving said medium along said path, means sequentially producing a concentrated magnetic field for coaction with said medium at angularly related points on the medium transversely displaced on the medium relative to the path of travel thereof and the points defining an arcuate line of magnetization on the medium, and means controlling the action of said producing means and varying a characteristic of said concentrated magnetic field to record corresponding portions of selected lines of the video signal in longitudinally aligned relation on the medium to minimize the effects of tracking errors during reproduction.

8. In combination an apparatus for recording a video signal having a given line frequency on an elongated medium of substantial transverse extent, means for scanning periodically across the transverse extent of successive incremental length portions of the medium with the number of successive scans per unit time equal to the inverse of an integral number of the order of 10 multiplied by the line frequency of the signal, means for recording a predetermined number of lines of said signal equal to said integral number of the order of 10 during each scan of said medium, means for recording corresponding portions of lines separated by said predetermined number of lines in longitudinal alignment along said medium, and means whereby the successive tracks recorded along the transverse extent of the record medium are of a dimension longitudinally of the record medium of the order of the displacement distance between centers of successive incremental length portions of the medium upon which successive tracks are recorded.

References Cited in the file of this patent

UNITED STATES PATENTS

| | | |
|---|---|---|
| 1,824,604 | Lederle | Sept. 22, 1931 |
| 2,064,585 | Atienza | Dec. 15, 1936 |
| 2,245,286 | Marzoochi | June 10, 1941 |
| 2,517,808 | Sziklai | Aug. 8, 1950 |
| 2,536,030 | Camras | Jan. 2, 1951 |
| 2,668,283 | Mullin | Feb. 2, 1954 |
| 2,743,319 | Thompson | Apr. 24, 1956 |
| 2,750,449 | Thompson | June 12, 1956 |
| 2,772,328 | Lyon | Nov. 27, 1956 |
| 2,773,120 | Masterson | Dec. 4, 1956 |
| 2,813,924 | Coutant et al. | Nov. 19, 1957 |

FOREIGN PATENTS

| | | |
|---|---|---|
| 995,953 | France | Aug. 22, 1951 |